Aug. 27, 1957

D. C. PRESTON 2,804,157

TRACTOR AXLE AND HUB

Filed Aug. 16, 1954

Donald C. Preston
INVENTOR.

BY *Clarence A. O'Brien*
*and Harvey B. Jacobson*
Attorneys

Aug. 27, 1957
D. C. PRESTON
2,804,157
TRACTOR AXLE AND HUB
Filed Aug. 16, 1954
2 Sheets-Sheet 2
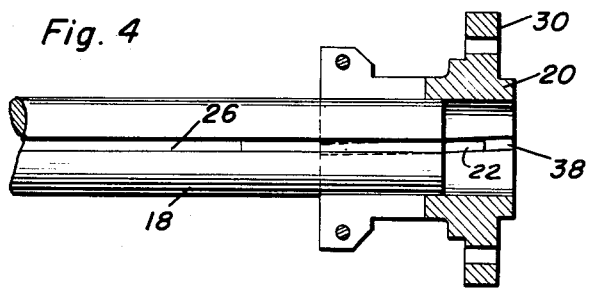
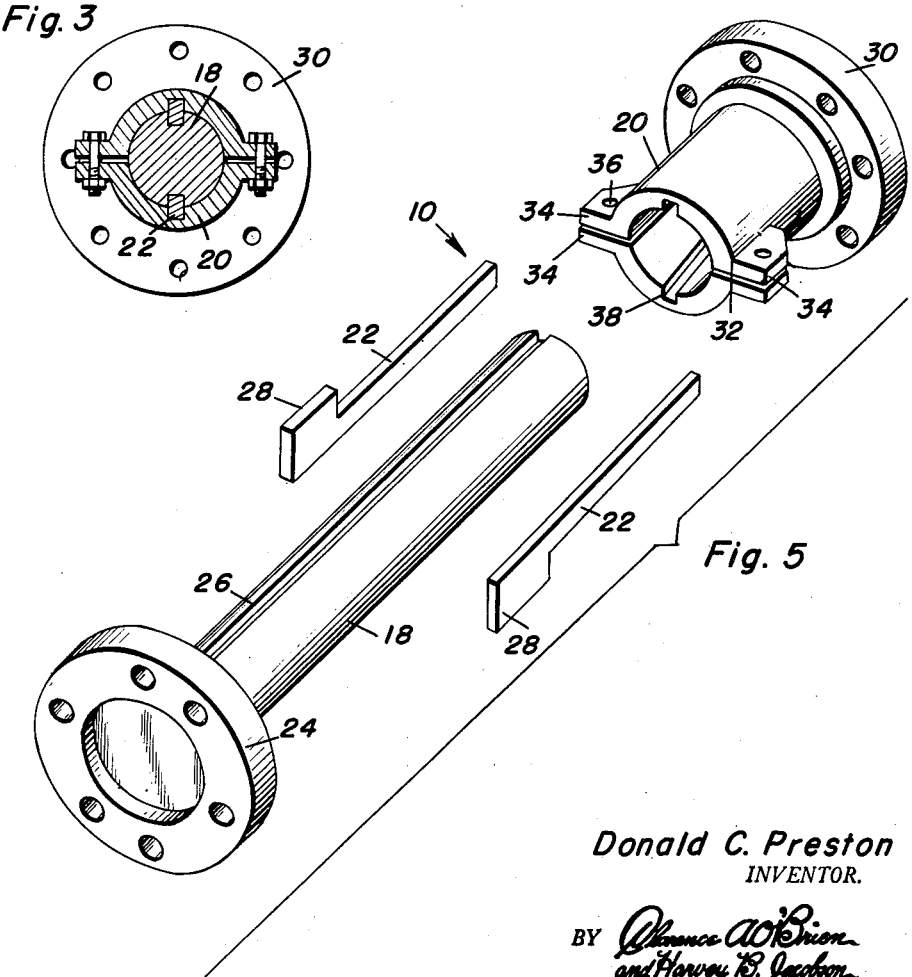
Donald C. Preston
INVENTOR.

United States Patent Office 2,804,157
Patented Aug. 27, 1957

2,804,157

TRACTOR AXLE AND HUB

Donald C. Preston, Mitchell, Nebr.

Application August 16, 1954, Serial No. 450,063

4 Claims. (Cl. 180—75)

The present invention relates to tractors, and more particularly relates to a tractor axle extension assembly for spreading the rear wheels of a tractor and increasing the over-all width of the tractor.

The primary object of the invention is to provide a detachable or demountable tractor axle extension assembly which may be readily applied to and demounted from the ends of the conventional tractor axle for increasing the over-all width of the tractor.

A further object of the invention is in the provision of a detachable tractor axle extension assembly which permits an infinite number of space settings between extremes of the tractor wheels when mounted upon the extension assembly to vary the over-all distance between the rear wheels of the tractor.

A further and highly important object of the invention is in the provision of a separable tractor axle extension and hub for slipping over this extension, which members have a novel keyway and key cooperating means assisting in the non-slidable and non-rotatable relation of these parts to one another when the assembly has been positioned in the desired manner.

Another object of the invention, ancillary to the preceding object and forming a part thereof, is the provision of substantially longitudinally extending, slightly helical keyways in the hub as compared with longitudinal keyways in the axle extension shaft whereby upon the insertion of keys into the mating keyways, partial restraint against sliding movement between the hub and the axle extension shaft as well as complete restraint against rotational movement of these members relative to one another is accomplished while the end of the hub in which the keys slide is bifurcated and provided with means for drawing the furcations thereof toward one another to completely frictionally clamp the hub against longitudinal movement along the axle extension.

A further object of the invention is to provide an extensible axle assembly for the rear axle of a tractor which is exceedingly simple in construction and composed of easily separable parts independent from one another for individual replacement as required.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a cross-sectional view of the assembly taken substantially along the plane of section line 3—3 of Figure 2;

Figure 4 is a cross-sectional view of a portion of the assembly taken substantially along the plane of section line 3—3 of Figure 2; and Figure 5 is an exploded perspective view of the entire assembly.

Figure 1:
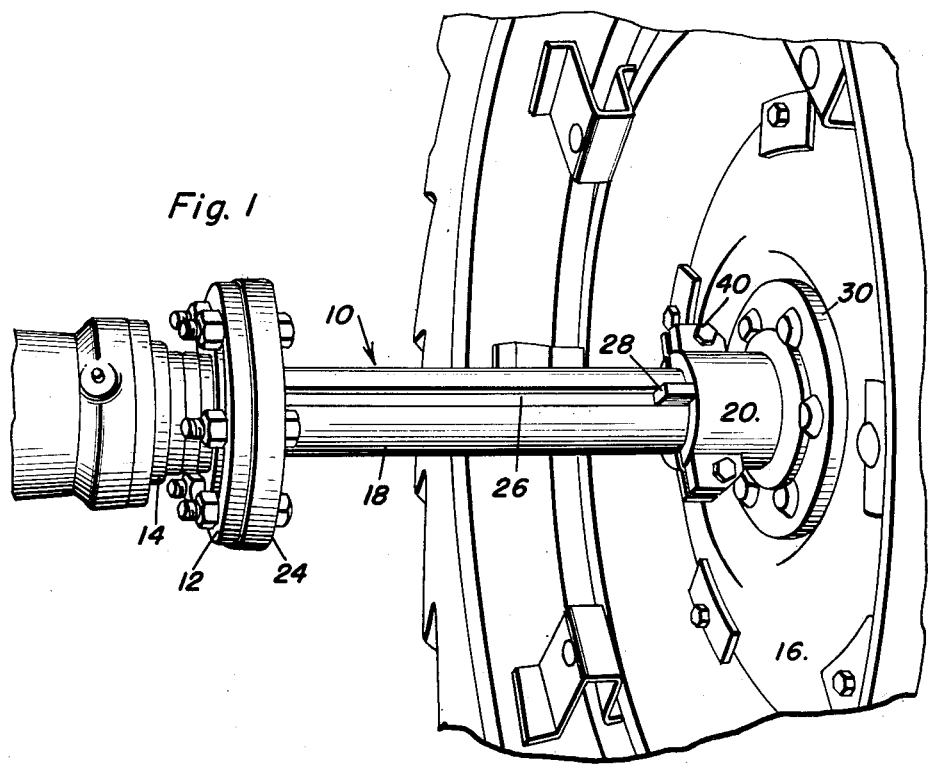
Figure 1 is a perspective view of the tracks of the demountable tractor axle extension of the present invention attached to the rear axle of the tractor and having a tractor wheel mounted thereon.
Figure 2:
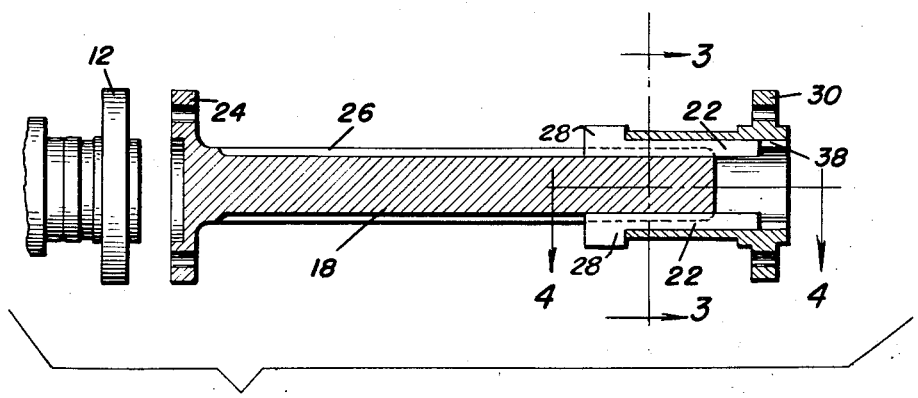
Figure 2 is a cross-sectional view through the axle extension assembly disclosing the manner of attaching the same to a mounting flange on the rear tractor axle.

In the drawings, the demountable tractor axle extension assembly is designated in its entirety by the numeral 10 and is shown in Figure 1 as being attached to the mounting flange 12 of the rear axle 14 of a tractor to constitute a longitudinal extension of this axle with a rear tractor wheel 16 being mounted on the assembly.

The assembly comprises basically an elongated axle extension shaft 18, hub 20 and keys 22.

The elongated axle extension shaft 18 is provided with a mounting flange 24 at one end thereof whereby the shaft is fixedly secured to the mounting flange 12 of the tractor axle 14. It is to be noted that the mounting flange 24 is a substantial duplicate in its shape of the conventional mounting flange 12 of the tractor axle. The shaft 18 is further provided with diametrically opposite longitudinally extending straight keyways 26 which open into the free end of the shaft 18 remote from the flange 24. The keys 22 are in the form of elongated bars adapted to slide within the keyways 26 of the extension axle shaft 18. At their inner ends, each of the keys 22 is provided with a driving head 28 for a purpose that will become subsequently apparent.

The hub 20 is substantially in the form of a sleeve having a longitudinal bore therethrough of substantially the same diameter as the shaft 18 whereby the hub may slip over the free end of the shaft.

The outer end of the hub 20 is provided with a wheel mounting flange 30 for mounting the tractor wheels 16 thereon.

The other end of the hub 20 is bifurcated, as at 32, and provided with radially extending lugs 34 on each furcation thereof at diametrically opposite sides. The lugs on the same side of the hub of each mating pair of the opposing furcations are provided with registering apertures for the reception of fasteners to clamp the furcations together. These apertures are designated generally by the numeral 36.

On the inner surface opening into the bore of the hub, the hub is provided with longitudinally extending, diametrically opposite keyways or slots 38 which extend slightly helically from end to end of the hub as opposed to the longitudinal straight extension of the keyways 26 of the shaft 18.

Thus, when the hub 20 is slipped over the axle shaft 18, it is necessary that the keys 22 be driven into place in the mating keyways 38 and 26 of the hub and shaft respectively. Consequently, when these keys are driven into position by impact against the driving heads 28 thereof, a positive lock occurs between the keys, shaft 18 and hub 20 to positively retain the keys in the mating keyways 26 and 38 and to prevent slippage of one of these members with respect to the other in any event.

When so mounted, the hub 20 may then be slid to any desired position on the axle extension shaft 18, fasteners 40 extend through the apertures 36 of the lugs 34 and frictionally clamp the hub to the axle against further sliding movement thereon and position the wheel at the desired point on the axle extension shaft 18.

The result of the assembly is a quickly demountable and attachable axle extension assembly which enables an infinite number of changes in width between the tractor wheels of a tractor to widen the over-all width of the tractor as desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A detachable tractor axle extension assembly comprising an elongated shaft having a flanged end for coupling to the wheel mounting flange of a tractor axle, said shaft having diametrically opposite longitudinal straight keyways opening into the other end thereof, a hub adapted to slip over said shaft, said hub having substantially longitudinally extending keyways formed in the inner surface thereof, said hub keyways extending slightly helically through said hub, keys in said keyways non-rotatably mounting said hub on said shaft, means on one end of said hub for attaching the same to a tractor wheel, the other end of said hub being bifurcated and adapted to be clamped tightly on said shaft.

2. A detachable tractor axle extension assembly including an elongated shaft having longitudinal straight keyways formed in the surface thereof, a hub adapted to slip over said shaft, said hub having keyways on the inner surface thereof extending slightly helically to the longitudinal axis of the hub, the keyways of said hub and the keyways of said shaft being in substantially mating relation to one another, keys interfitting in said keyways non-rotatably mounting said hub on said shaft.

3. A detachable tractor axle extension assembly including an elongated shaft having longitudinal straight keyways formed in the surface thereof, a hub adapted to slip over said shaft, said hub having keyways on the inner surface thereof extending slightly helically to the longitudinal axis of the hub, the keyways of said hub and the keyways of said shaft being in substantially mating relation to one another, keys interfitting in said keyways non-rotatably mounting said hub on said shaft, each of said keys having a driving head on one end thereof abutting one end of the hub limiting the penetration of the key into the hub.

4. A detachable tractor axle extension assembly including an elongated shaft having longitudinal straight keyways formed in the surface thereof, a hub adapted to slip over said shaft, said hub having keyways on the inner surface thereof extending slightly helically to the longitudinal axis of the hub, the keyways of said hub and the keyways of said shaft being in substantially mating relation to one another, keys interfitting in said keyways non-rotatably mounting said hub on said shaft, each of said keys having a driving head on one end thereof abutting one end of the hub limiting the penetration of the key into the hub, the end of said hub into which said keys extend being bifurcated and having means thereon for drawing the furcations together to frictionally clamp the hub to the shaft.

References Cited in the file of this patent

UNITED STATES PATENTS

| | | |
|---|---|---|
| 612,302 | Ballot | Oct. 11, 1898 |
| 1,480,462 | Owen | Jan. 8, 1924 |
| 1,662,982 | Peters | Mar. 20, 1928 |
| 1,822,093 | Hendrickson | Sept. 8, 1931 |
| 1,990,344 | Newhouse | Feb. 5, 1935 |
| 2,240,312 | Minturn | Apr. 29, 1941 |
| 2,302,570 | Peterson | Nov. 17, 1942 |
| 2,546,453 | Koenig | Mar. 27, 1951 |
| 2,682,430 | Brubaker | June 29, 1954 |